US012334679B2

(12) United States Patent
Behling et al.

(10) Patent No.: US 12,334,679 B2
(45) Date of Patent: Jun. 17, 2025

(54) CONNECTION UNIT, CONNECTION ARRANGEMENT AND ELECTRONIC DEVICE

(71) Applicant: Phoenix Contact GmbH & Co. KG, Blomberg (DE)

(72) Inventors: Bernd Behling, Steinheim (DE); Mehmet Sagdic, Detmold (DE)

(73) Assignee: PHOENIX CONTACT GMBH & CO. KG, Blomberg (DE)

( * ) Notice: Subject to any disclaimer, the term of this patent is extended or adjusted under 35 U.S.C. 154(b) by 348 days.

(21) Appl. No.: 17/924,377

(22) PCT Filed: May 5, 2021

(86) PCT No.: PCT/EP2021/061852
§ 371 (c)(1),
(2) Date: Nov. 10, 2022

(87) PCT Pub. No.: WO2021/228654
PCT Pub. Date: Nov. 18, 2021

(65) Prior Publication Data

US 2023/0208078 A1 Jun. 29, 2023

(30) Foreign Application Priority Data

May 12, 2020 (BE) .................................. 2020/5323

(51) Int. Cl.
*H01R 13/631* (2006.01)
*H01R 4/48* (2006.01)
(Continued)

(52) U.S. Cl.
CPC ........... *H01R 13/6315* (2013.01); *H01R 4/48* (2013.01); *H01R 13/18* (2013.01); *H01R 25/14* (2013.01)

(58) Field of Classification Search
CPC ................................................. H01R 13/6315
(Continued)

(56) References Cited

U.S. PATENT DOCUMENTS 2,303,425 A * 12/1942 Bickham .................. H01H 1/42 200/253.1
2,872,659 A * 2/1959 Wills ..................... H01R 13/18 439/819
(Continued)

FOREIGN PATENT DOCUMENTS

EP 2164136 A2 * 3/2010 ........... H01R 13/113
EP 2696447 A1 2/2014
(Continued)

*Primary Examiner* — Marcus E Harcum
(74) *Attorney, Agent, or Firm* — LEYDIG, VOIT & MAYER, LTD.

(57) ABSTRACT

A connection unit for connecting at least one connection element includes: a housing; a first contact element; a second contact element arranged on an opposite side to the first contact element, at least one receiving space being formed between the first contact element and the second contact element for clamping the at least one connection element between the first contact element and the second contact element; and at least one finger guard element which covers at least some regions of the first contact element and the second contact element in a region of the at least one receiving space. The first contact element, the second contact element, and the finger guard element are borne in the housing in a floating manner.

15 Claims, 4 Drawing Sheets

(51) Int. Cl.
*H01R 13/18* (2006.01)
*H01R 25/14* (2006.01)

(58) Field of Classification Search
USPC ................................ 439/248, 251, 246, 213
See application file for complete search history.

(56) References Cited

U.S. PATENT DOCUMENTS

| | | | | | |
|---|---|---|---|---|---|
| 3,201,556 | A * | 8/1965 | Baird | H01H 1/42 | 200/282 |
| 3,427,419 | A * | 2/1969 | Findley, Jr. | H01H 1/42 | 200/255 |
| 4,015,854 | A | 4/1977 | Ramond | | |
| 4,121,067 | A * | 10/1978 | Rexroad | H02B 11/04 | 200/290 |
| 4,230,388 | A | 10/1980 | Thierry et al. | | |
| 4,423,917 | A * | 1/1984 | Scheingold | H01R 13/6315 | 439/249 |
| 4,445,732 | A * | 5/1984 | Wafer | H01H 1/54 | 439/38 |
| 4,453,792 | A * | 6/1984 | Bright | H01R 31/00 | 439/251 |
| 4,995,814 | A * | 2/1991 | Weidler | H01R 25/162 | 439/856 |
| 5,167,529 | A * | 12/1992 | Verge | H01R 11/24 | 439/759 |
| 5,211,585 | A * | 5/1993 | Douty | H01R 13/64 | 439/248 |
| 6,139,347 | A * | 10/2000 | Nebon | H02B 11/04 | 439/821 |
| 7,581,972 | B2 * | 9/2009 | Daamen | H01R 13/6315 | 439/249 |
| 7,795,551 | B2 * | 9/2010 | Narayanan | H01H 1/42 | 200/255 |
| 8,123,553 | B2 * | 2/2012 | Lyu | H02B 11/04 | 200/254 |
| 8,177,587 | B2 * | 5/2012 | Takagi | H01R 13/514 | 439/74 |
| 8,998,618 | B2 * | 4/2015 | Hashiguchi | H01R 13/113 | 439/787 |
| 9,379,489 | B2 * | 6/2016 | Ebisawa | H01R 13/15 | |
| 9,455,515 | B2 * | 9/2016 | Ebisawa | H01R 4/48 | |
| 11,101,601 | B2 * | 8/2021 | Itou | H01R 13/4364 | |
| 11,469,056 | B2 * | 10/2022 | Bossoni | H01H 1/14 | |
| 11,699,887 | B2 * | 7/2023 | Jin | H01R 25/162 | 439/214 |
| 2014/0080339 | A1 | 3/2014 | Ebisawa | | |
| 2015/0333442 | A1 * | 11/2015 | Naganuma | H01R 12/91 | 439/121 |
| 2019/0052005 | A1 * | 2/2019 | Hasegawa | H01R 13/405 | |
| 2020/0127417 | A1 * | 4/2020 | Shimba | H01R 12/91 | |
| 2021/0111517 | A1 * | 4/2021 | Tamaki | H01R 43/16 | |

FOREIGN PATENT DOCUMENTS

| | | | |
|---|---|---|---|
| EP | 2698877 | A1 | 2/2014 |
| EP | 2846411 | B1 | 10/2017 |
| FR | 3086809 | A1 * | 4/2020 |
| JP | S50132634 | A | 10/1975 |
| JP | S5244369 | U | 3/1977 |
| JP | S5543992 | A | 3/1980 |
| JP | 200619025 | A | 1/2006 |
| JP | 20138612 | A | 1/2013 |
| JP | 2018198441 | A | 12/2018 |

* cited by examiner

CONNECTION UNIT, CONNECTION ARRANGEMENT AND ELECTRONIC DEVICE

CROSS-REFERENCE TO PRIOR APPLICATIONS

This application is a U.S. National Phase application under 35 U.S.C. § 371 of International Application No. PCT/EP2021/061852, filed on May 5, 2021, and claims benefit to Belgian Patent Application No. BE 2020/5323, filed on May 12, 2020. The International Application was published in German on Nov. 18, 2021 as WO/2021/228654 under PCT Article 21(2).

FIELD

The invention relates to a connection unit for connecting at least one connection element. Furthermore, the invention relates to a connection arrangement and to an electronic device.

BACKGROUND

By way of example, EP 2 846 411 B1 discloses a connection unit for connecting a connection element, for example a busbar, a bus conductor, or a flat contact. The connection unit has a pair of conductive components and a biasing part, which is fitted between the pair of conductive components and biases the pair of conductive components toward each other, the connection unit being adapted to be joined to a joining object inserted between the pair of conductive components by holding the joining object between the pair of conductive components. Each conductive component of the pair has a base portion and an attaching portion, which is formed on the base portion and is joined to the biasing part, the base portion of one of the conductive components and the base portion of the other conductive component being arranged to be spaced apart from one another. At least one out of the pair of conductive components has a support portion, which is integral with the base portion and extends from the base-portion side toward the other conductive component in order to contact and support the other conductive component. In addition, each conductive component of the pair has a first contact portion for contact with the joining object, and a second contact portion for contact with another contact object, the second contact portion being formed on a side opposite to the first contact portion with respect to the attaching portion interposed therebetween. At least one out of the pair of conductive components integrally has, at a position facing the side of the other conductive component, a non-resilient contact-side engaging portion for engagement with a joining-object-side engaging portion formed on the joining object, the contact-side engaging portion being formed on the first-contact-portion side with respect to the attaching portion. At least one out of the pair of conductive components further has an inclination control portion, which is protrudingly formed at a position facing the other conductive component and is adapted to limit the relative inclination between the joining object and the contact. The inclination control portion is on the first-contact-portion side with respect to the attaching portion and between the support portion and the contact-side engaging portion.

However, a connection unit of this kind has a large overall width, so it requires a lot of installation space. In addition, it is complex and cost-intensive to manufacture owing to the large number of components and large number of bends.

SUMMARY

In an embodiment, the present invention provides a connection unit for connecting at least one connection element, comprising: a housing; a first contact element; a second contact element arranged on an opposite side to the first contact element, at least one receiving space being formed between the first contact element and the second contact element for clamping the at least one connection element between the first contact element and the second contact element; and at least one finger guard element which covers at least some regions of the first contact element and the second contact element in a region of the at least one receiving space, wherein the first contact element, the second contact element, and the finger guard element are borne in the housing in a floating manner.

BRIEF DESCRIPTION OF THE DRAWINGS

The present invention will be described in even greater detail below based on the exemplary figures. The invention is not limited to the exemplary embodiments. Other features and advantages of various embodiments of the present invention will become apparent by reading the following detailed description with reference to the attached drawings which illustrate the following.

DETAILED DESCRIPTION

Figure 1:
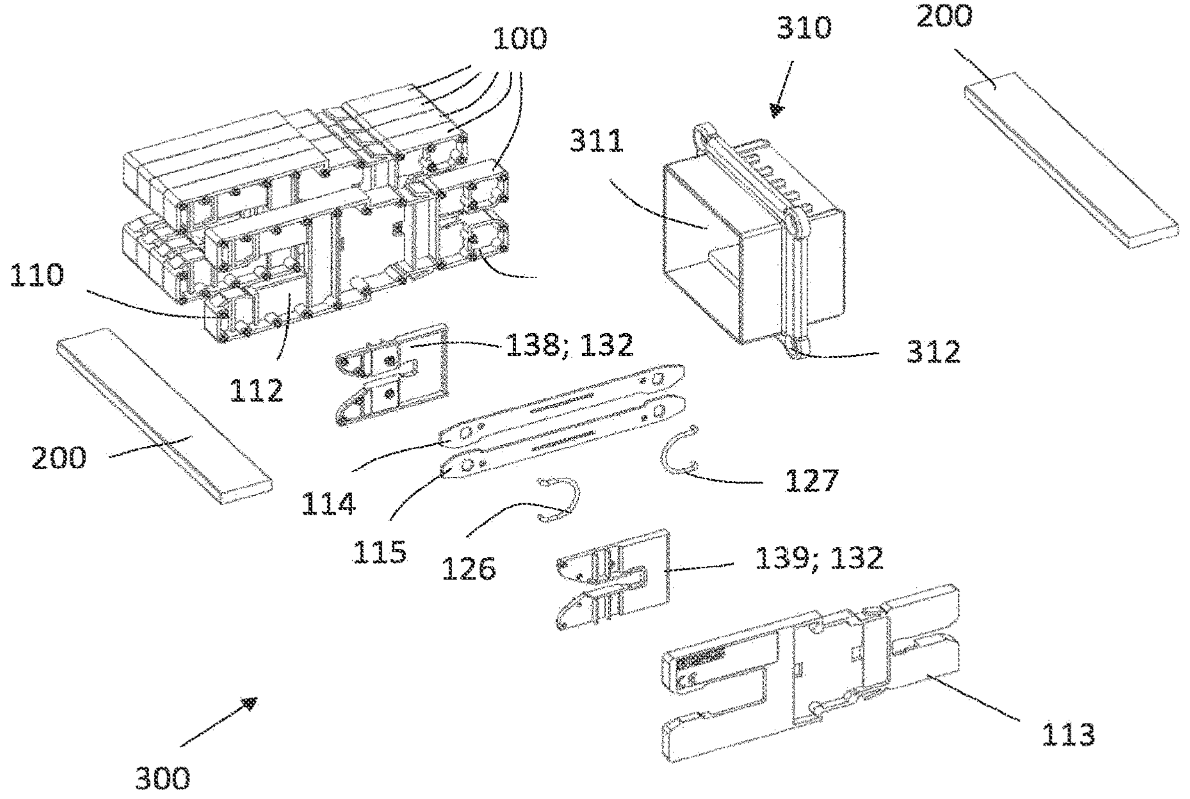
FIG. 1 is a schematic exploded view of a connection arrangement according to the invention.
Figure 2:
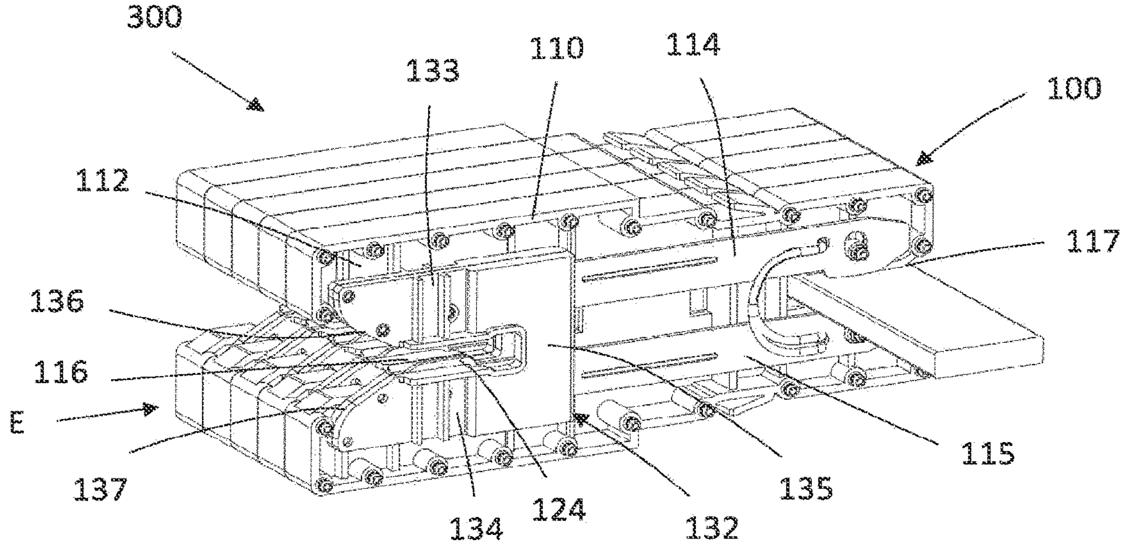
FIG. 2 is a schematic illustration of the connection arrangement shown in FIG. 1, partly assembled.

In an embodiment, the present invention provides a connection unit, a connection arrangement, and an electronic device that are distinguished on account of simplified construction while simultaneously offering high safety levels for users.

The connection unit according to the invention has a housing, a first contact element, and a second contact element arranged on the opposite side to the first contact element, at least one receiving space being formed between the first contact element and the second contact element for the purpose of clamping the at least one connection element between the first contact element and the second contact element. In addition, the connection unit has at least one finger guard element, which covers at least some regions of the first contact element and the second contact element in the region of the at least one receiving space, wherein the first contact element, the second contact element, and the finger guard element are borne in the housing in a floating manner.

The connection unit has two contact elements, which form at least one, preferably two, receiving spaces between each other for clamping one or two connection elements between them in an electrically contacting manner. A first receiving space may be formed on a first end region of the two contact elements, and a second receiving space may be formed on a second end region of the two contact elements, which second end region is on the opposite side to the first end region. In the region of each receiving space, the housing preferably has an insertion opening for inserting the connection element that is to be connected. Preferably, each insertion opening is formed in the manner of a slot in the housing. To ensure that the connection element is safely connected for a user, the connection unit has at least one finger guard element. Preferably, the finger guard element is made of a non-conductive insulation material such as a plastics material. The finger guard element is positioned such that it covers the two contact elements at one of their receiving spaces in such a way that, when a connection element is positioned or pushed into the receiving space, a user's fingers cannot come into contact with one of the contact elements. The connection unit is characterized in particular in that the two contact elements, and also the finger guard element, are borne in the housing in a floating manner. Owing to their floating bearing, the contact elements and the finger guard element can in particular move relative to the housing. In addition, the two contact elements can move relative to one another. The finger guard element can also move relative to the two contact elements. As a result, the position of the contact elements and of the finger guard element can be optimally adjusted depending on the inserted connection element, in particular depending on the dimensions of the inserted connection element and the angle at which the connection element is pushed into the receiving space. Since the contact elements and the finger guard element are borne in a floating manner, they do not have a fixed axis of rotation inside the housing. Owing to the floating bearing, the contact elements arranged in the housing and the finger guard element have a clearance in the housing, as a result of which the finger guard element and the contact elements can in particular also move purely in translation. In particular, the contact elements can also perform a rotational movement inside the housing without a fixed center of rotation. The connection unit is thus highly adaptable to the connection element to be connected while simultaneously offering high levels of safety for users and simple construction for the connection unit.

The housing can be formed in two parts such that the contact elements and the finger guard element can be assembled in the housing in a simple manner.

Preferably, the housing has a disk shape, meaning that the connection unit can have a small overall width and the installation space required for the connection unit can thus be reduced.

Preferably, the finger guard element is attached directly to the two contact elements; the attachment can be formed by the finger guard element being movably borne on the first contact element and on the second contact element. It can thus be ensured that the finger guard element is securely held on the contact elements while the finger guard element is simultaneously able to move relative to the contact elements.

The finger guard element may have a U shape having a first leg and a second leg formed in parallel with the first leg, wherein the first leg may cover the first contact element at least in some regions, and the second leg may cover the second contact element at least in some regions. By its two legs, the finger guard element may form a finger guard for both the first contact element and the second contact element. Preferably, the two legs each extend in parallel with the length of the contact elements. Preferably, the two legs extend into the receiving space in parallel with the insertion direction of a connection element. The two legs of the finger guard element may be joined together by means of a joining portion, which may extend transversely to the insertion direction. In the insertion direction, the joining portion preferably extends behind the receiving space for receiving the connection element.

To simplify the assembly of the finger guard element in particular on the two contact elements, the finger guard element may be formed in two parts. During assembly, the two contact elements may be placed in the finger guard element before the finger guard element is sealed. The two parts of the finger guard element are preferably formed symmetrically with one another. The two parts of the finger guard element may be joined together by means of a plugging and/or latching connection when the two contact elements are placed in the finger guard element. Preferably, the finger guard element has a relatively small thickness such that the finger guard element may have a discoid form.

For the two contact elements to be borne while simultaneously being able to move relative to one another, the first contact element and the second contact element can be joined together by means of at least one spring element. By way of example, the spring element may be a bent wire spring or a helical spring. The spring element may be hooked into openings formed in the two contact elements. Preferably, two spring elements are provided, by means of which the two contact elements are joined together. If two spring elements are provided, they are arranged to be spaced apart from one another on the two contact elements. Preferably, a first spring element can then be attached to the first end region of the two contact elements, and the second spring element can be attached to the second end region of the two contact elements. The spring elements are then preferably attached directly adjacent to the bearing of the finger guard element on the contact elements.

Preferably, the first contact element and the second contact element may each have a first bearing point and a second bearing point, which is arranged to be spaced apart from the first bearing point, wherein the first contact element and the second contact element may be held on the finger guard element by the first bearing point, and the first contact element and the second contact element may be held on the housing by the second bearing point. The two contact elements can thus be borne on both the finger guard element and the housing; the two contact elements can be borne on, and thus attached to, the finger guard element at their first end region and borne on/attached to the housing at their second end region. In the region of the bearing of the contact elements on the finger guard element, the contact elements are preferably not directly joined to the housing.

Both the first bearing point and the second bearing point of the two contact elements may each be formed as slots. By way of example, pins may be formed on the housing, which protrude through the relevant slot at the second bearing point in order to movably bear the contact elements on the housing. For example, pins may also be formed on the finger guard element, which protrude through the relevant slot at the first bearing point in order to movably bear the two contact elements on the finger guard element. Owing to the slots, it is possible to configure a defined range of motion within which the contact elements can move relative to the housing or to the finger guard element.

The finger guard element may be borne in the housing in a floating manner by means of a slotted guide. The slotted guide may be formed by the housing, or by a wall of the housing, in that a wall of the housing defines and limits the range of motion of the finger guard element. The slotted guide allows the finger guard element to move freely in a plurality of axes within defined boundaries. In particular, the slotted guide allows the finger guard element to move transversely to the insertion direction.

The contact elements are preferably not bent parts, but rather the first contact element and the second contact element may each be in the form of an oblong metal sheet extending in just one plane. The contact elements thus have a very compact and flat design, as a result of which the installation size of the connection unit can be reduced. In addition, the contact elements can be produced by simple punching without considerable effort and without any need to provide a subsequent, complex bending process. The two contact elements are preferably congruent with one another. The two contact elements are preferably in mirror symmetry with one another along a longitudinal axis of the connection unit.

To be able to create good, defined contact between the contact elements and the connection element to be connected, the first contact element and the second contact element may each have a contact region in the region of the at least one receiving space, and said contact regions may have a rounded form at least in some portions. In the connected state, the contact elements abut, by their contact regions, the connection elements directly such that a connected connection element is clamped between a contact region of the first contact element and a contact region of the second connection element. Owing to the rounding of the contact regions, inserting the connection element into the receiving space between the two contact elements can also be made simpler since the connection elements can be guided along the rounded portion into the desired position inside the receiving space. The contact regions of the two contact elements may be domed with respect to one another such that the receiving space may taper in the insertion direction.

In an embodiment, the invention provides a connection arrangement having a plurality of connection units as described, formed, and developed above, arranged in a row.

Since the connection units have in particular a very narrow design, a plurality of connection units can be arranged compactly next to one another. To further reduce the installation space required, connection units arranged in a row can cover one another so that an interior of one connection unit can be covered and sealed by the housing of a connection unit arranged adjacent thereto. In that case, only the housing of the last connection unit in the row of connection units would be formed in two parts, in that the housing could have a housing cover for sealing the housing.

The connection arrangement may have a holding frame, wherein the plurality of connection units arranged in a row can be held in the holding frame. The holding frame may have an opening through which the connection units arranged in a bundle can protrude. The holding frame may thus enclose or encompass the connection units arranged in a row. By way of example, the holding frame may be assembled in a wall opening in a wall such that the connection units can be guided through and held in a wall opening by way of the holding frame. The wall may be a wall of an electronic device, for example.

In an embodiment, the invention provides an electronic device having at least one connection unit as described, formed, and developed above and/or at least one connection arrangement as described, formed, and developed above.

FIG. 1 is an exploded view of a connection arrangement 300. The connection arrangement 300 has a plurality of connection units 100 arranged in a row; in the configuration shown here, two connection elements 200 can be received on the connection units 100 and connected in an electrically contacting manner by the two connection elements 200 being received and clampingly contacted on opposite sides of the connection units 100. Here, the connection elements 200 are in the form of busbars.

Each connection unit 100 has a housing 110, which is preferably made of an insulation material, for example a plastics material. Each housing 110 has two insertion openings 111 formed on opposite sides and through which a connection element 200 can be inserted.

The housings 110 are open on one side so that, during assembly, the other parts of the connection unit 100 can be placed and assembled in the interior 112 of the housing 110. A housing 110 of one connection unit 100 can be sealed by the housing 110 of the connection unit 100 arranged adjacent thereto. The housing 110 of the last connection unit 100 in the row is sealed by a housing cover 113.

Figure 3:
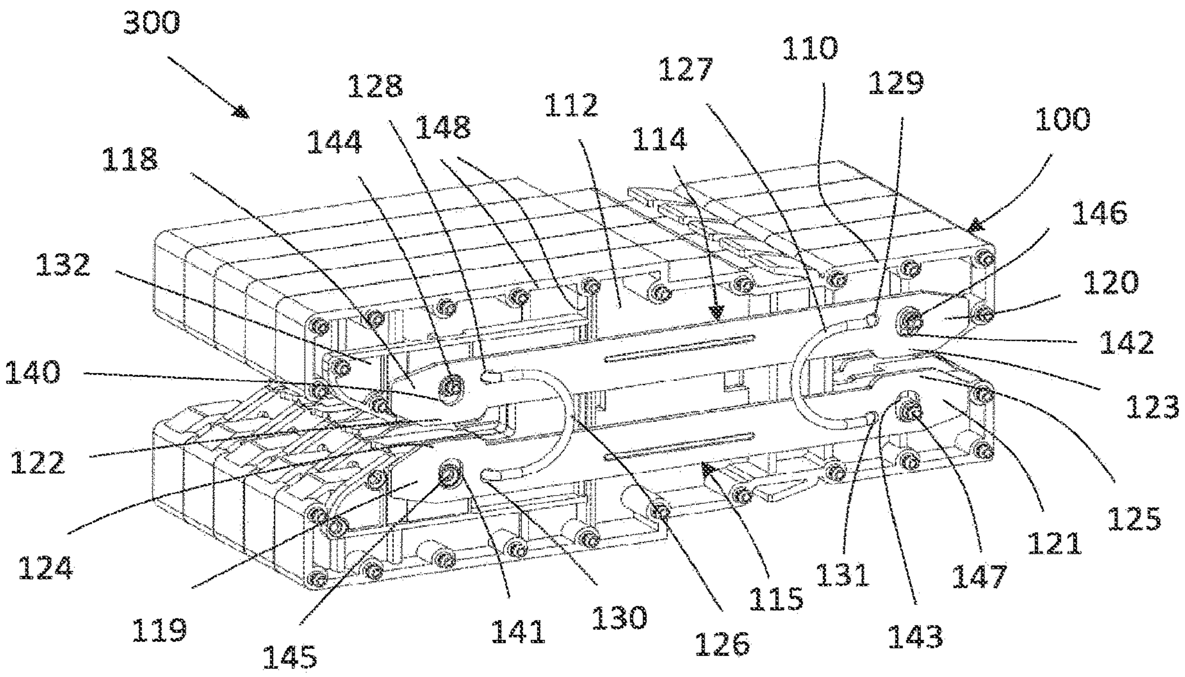
FIG. 3 is a further schematic illustration of the connection arrangement shown in FIG. 1, partly assembled.

Two contact elements 114, 115 are arranged in the interior 112 of the housing 110 of a connection unit 100. The contact elements 114, 115 are congruent with one another. The contact elements 114, 115 are each in the form of an oblong metal sheet extending in just one plane. The contact elements 114, 115 are positioned in the housing 110 such that they extend, at least in a starting state as shown by way of example in FIG. 3, into the connection unit 100 substantially in parallel with the insertion direction E of the connection elements 200.

In this case, two receiving spaces 116, 117, into each of which a connection element 200 can be inserted, are formed between the two contact elements 114, 115. A first receiving space 116 is formed on a first end region 118, 119 of the two contact elements 114, 115, and a second receiving space 117 is formed on a second end region 120, 121 of the two contact elements 114, 115, which second end region is on the opposite side to the first end region 118, 119.

In the region of each receiving space 116, 117, the two contact elements 114, 115 have a contact region 122, 123, 124, 125. The contact regions 122, 123, 124, 125 are each formed at the end regions 118, 118, 120, 121 of the contact elements 114, 115. The contact regions 122, 123, 124, 125 each extend along an edge surface of the contact elements 114, 115. The contact regions 122, 123, 124, 125 have a rounded form in some portions. The contact regions 122, 123, 124, 125 of the two contact elements 114, 115 are domed with respect to one another such that the receiving space 116, 117 may taper in the insertion direction E.

The two contact elements 114, 115 are joined together by means of two spring elements 126, 127. In this case, the two spring elements 126, 127 are formed as bent wire springs. The spring elements 126, 127 are each bent in a U shape. In the contact elements 114, 115, there are formed openings 128, 129, 130, 131 in which the spring elements 126, 127 are hooked and thereby attached to the contact elements 114, 115. The two spring elements 126, 127 are arranged to be spaced apart from one another.

When a connection element 200 is pushed or inserted into one of the connection regions 116, 117, the contact elements 114, 115 may be pressed apart by means of the connection element 200, counter to the spring force of the particular spring element 126, 127. When the connection element 200 is pushed into the relevant receiving space 116, 117, the contact elements 114, 115 can be pressed, by their contact regions 122, 123, 124, 125, against the inserted connection element 200 by the spring force of the spring elements 126, 127, in order to contactingly clamp the connection element 200. Since the contact elements 114, 115 can move relative to one another and the contact elements 114, 115 are borne in a floating manner without a fixed axis of rotation, it is possible to connect connection elements 200 of different configurations, in particular of different thicknesses.

In addition, the connection units 100 each have a finger guard element 132. In this case, the finger guard element 132 is only arranged in the region of the first receiving space 116. It would be possible, however, for a further finger guard element 132 to also be arranged in the region of the second receiving space 117. The finger guard element 132 covers at least some regions of the two contact elements 114, 115 in the region of the receiving space 116.

The finger guard element 132 has a U shape, in that the finger guard element 132 has two legs 133, 134, formed in parallel with one another, and a joining portion 135 joining the two legs 133, 134 together. The two legs 133, 134 extend in parallel with the insertion direction E. The joining portion 135 extends transversely to the insertion direction E. The first leg 133 engages around the first contact element 114, and the second leg 134 engages around the second contact element 115. The two legs 133, 134 each have a slot-like opening through which the contact elements 114, 115 can protrude by their contact region 122, 123, 124, 125. At their free ends, the legs 133, 134 have insertion bevels 136, 137, which make it simpler to insert the connection element 200 into the receiving space 116, 117.

The finger guard element 132 is formed to be very narrow transversely to the plugging direction, such that the finger guard element 132 forms a disk shape.

To make it simpler to assemble the finger guard element 132 on the two contact elements 114, 115, the finger guard element 132 is made from two parts: a first part 138 and a second part 139. The two parts 138, 139 are substantially congruent with one another and each form one part of the two legs 133, 134 and one part of the joining portion 135. During assembly, the two contact elements 114, 115 can be placed in the first part 138 and then the second part 139 can be assembled on the first part 138. In the assembled state, the two contact elements 114, 115 extend between the two parts 138, 139 of the finger guard element 132.

As can be seen in FIGS. 2 to 7, the two contact elements 114, 115 and the finger guard element 132 are borne in the housing 110 in a floating manner, such that the contact elements 114, 115 and the finger guard element 132 are borne in a movable manner relative to one another.

The two contact elements 114, 115 each have a first bearing point 140, 141 and a second bearing point 142, 143.

The two contact elements 114, 115 are held on the finger guard element 132 by the first bearing point 140 of the first contact element 114 and the first bearing point 141 of the second contact element 115. The first bearing point 140, 141 is formed in the manner of a slot in both contact elements 114, 115. A pin 144, 145 is formed on each of the two legs 133, 134 of the finger guard element 132, said pins protruding into the slots formed as the first bearing points 140, 141, as can be seen by way of example in FIG. 3. Owing to the slots, the finger guard element 132 is movably borne on the two contact elements 114, 115 such that the finger guard element 132 and the contact elements 114, 115 can move relative to one another. The slots extend in length transversely to the insertion direction E. By their first end regions 118, 119, the two contact elements 114, 115 are thus held only on the finger guard element 132, and there is no join between the housing 110 and the contact elements 114, 115.

At their second end regions 120, 121, however, the contact elements 114, 115 are directly held on the housing 110. The second bearing point 142, 143 formed at the second end regions 120, 121 is thus used for holding the contact elements 114, 115 on the housing 110. The second bearing point 142, 143 is likewise formed in the manner of a slot in both contact elements 114, 115. Pins 146, 147 formed on the housing 110 protrude into the slots such that the contact elements 114, 115 are movably borne on the housing 110 in the process. These slots also extend in length transversely to the insertion direction E.

The finger guard element 132 is borne in the housing 110 in a floating manner by means of a slotted guide. The slotted guide is formed by a wall 148 of the housing 110, which wall limits the mobility of the finger guard element 132 inside the interior 112 of the housing 110. The wall 148 is formed by an external wall of the housing 110 and also by an inner wall of the housing 110 extending transversely to the insertion direction E. In this case, the wall 148 is formed such that it allows the finger guard element 132 to move transversely to the insertion direction E and thus upward and downward, whereas the finger guard element 132 cannot move in the insertion direction E.

Figure 4:
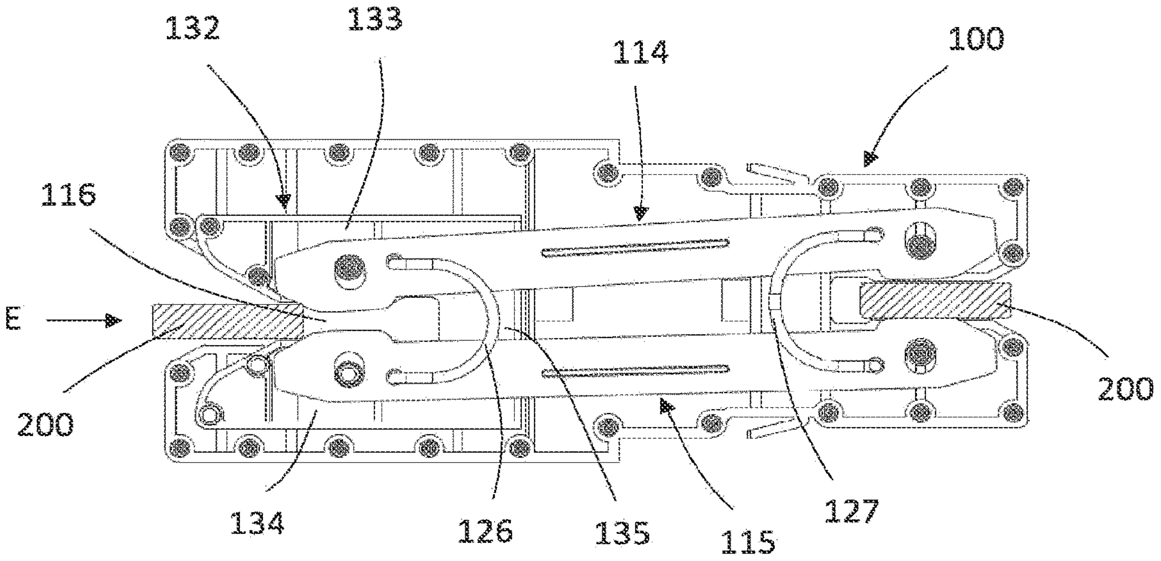
FIG. 4 is a schematic illustration of the connection arrangement shown in FIG. 3 with the finger guard element shifted down.
Figure 6:
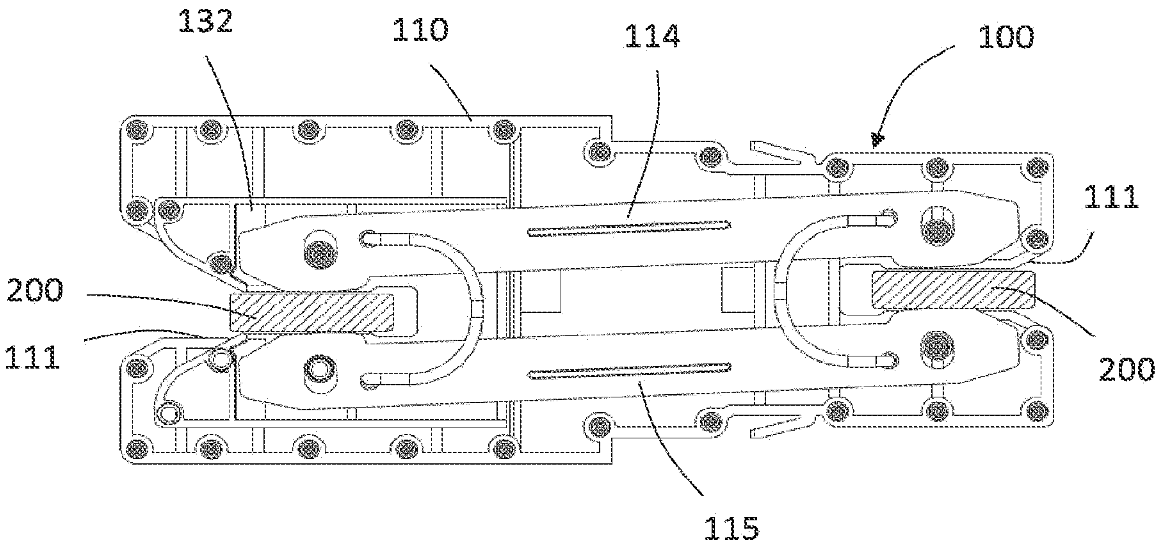
FIG. 6 is a schematic illustration of the connection arrangement shown in FIG. 4 with a connection element inserted.

In the position shown in FIG. 4, a connection element 200 is already inserted and clampingly contacted in the second receiving space 117. The connection element 200 is not inserted into the first receiving space 116, so the contact elements 114, 115 are slightly oblique to one another. In this case, the finger guard element 132 is shifted down. In FIG. 6, the connection element 200 is also inserted into the first receiving space 116.

Figure 5:
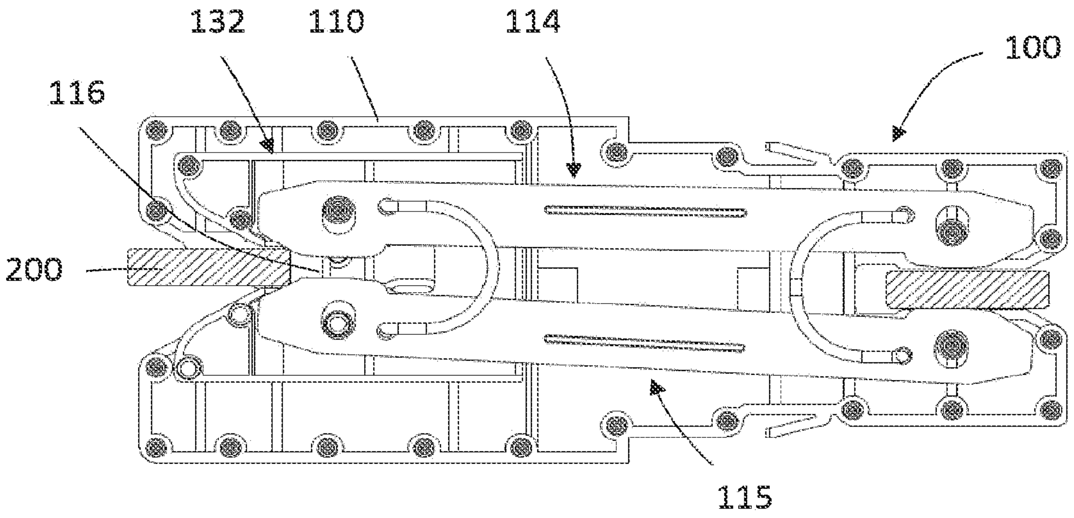
FIG. 5 is a schematic illustration of the connection arrangement shown in FIG. 3 with the finger guard element shifted up.
Figure 7:
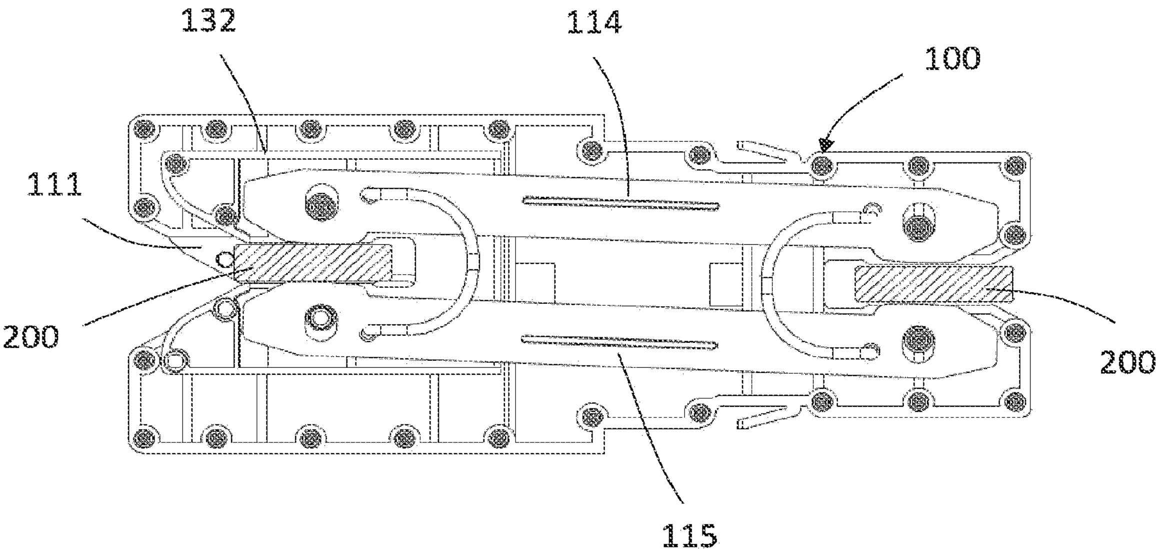
FIG. 7 is a schematic illustration of the connection arrangement shown in FIG. 5 with a connection element inserted.

By contrast, the finger guard element 132 is shifted up in the configurations shown in FIGS. 5 and 7.

Figure 8:
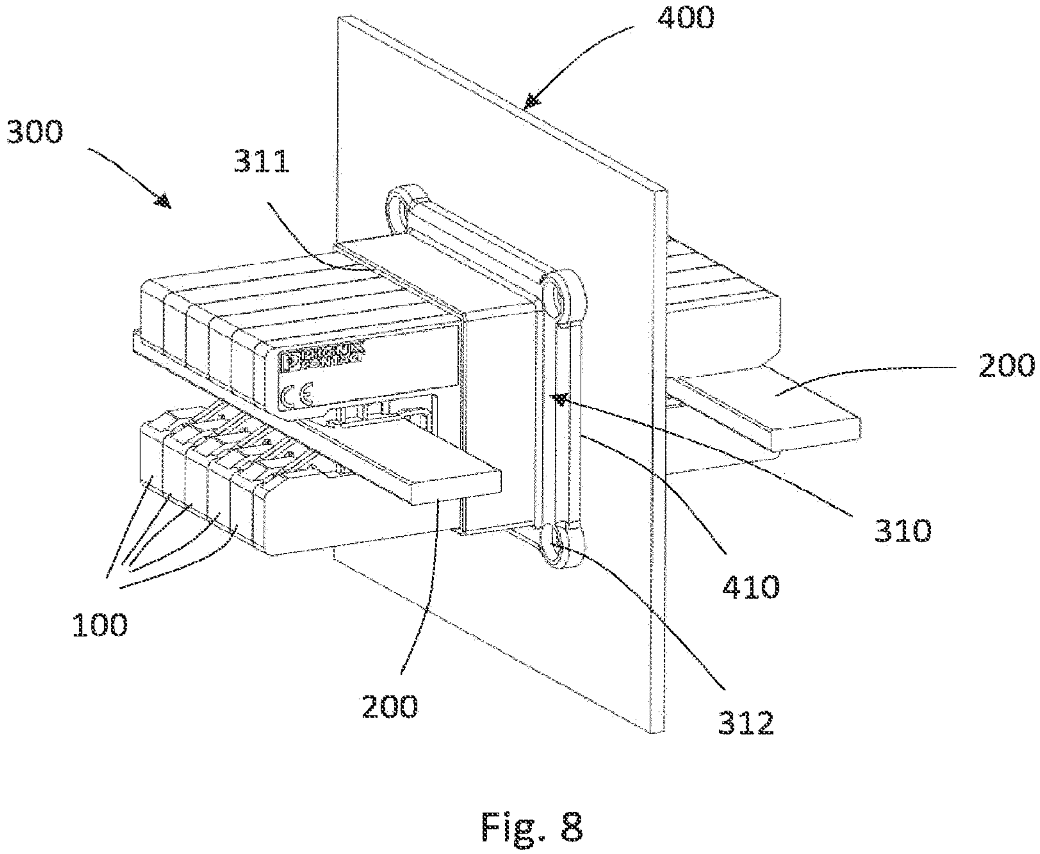
FIG. 8 is a schematic illustration of the connection arrangement shown in FIG. 1, assembled in a wall opening.

FIG. 8 shows the connection arrangement 300 assembled in a wall opening 410 in a wall 400. The connection arrangement 300 has a holding frame 310, which is in the shape of a frame. The holding frame 319 has an opening 311, through which the connection units 100 arranged in a row are guided and held therein. The opening 311 is window-like. The holding frame 310 has attaching elements 312, by means of which the holding frame 310 can be attached to the wall 400, for example by means of screw joints.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below. Additionally, statements made herein characterizing the invention refer to an embodiment of the invention and not necessarily all embodiments.

The terms used in the claims should be construed to have the broadest reasonable interpretation consistent with the foregoing description. For example, the use of the article “a” or “the” in introducing an element should not be interpreted as being exclusive of a plurality of elements. Likewise, the recitation of “or” should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

LIST OF REFERENCE SIGNS

100 Connection unit
110 Housing
111 Insertion opening
112 Interior
113 Housing cover
114 Contact element
115 Contact element
116 Receiving space
117 Receiving space
118 End region
119 End region
120 End region
121 End region
122 Contact region
123 Contact region
124 Contact region
125 Contact region
126 Spring element
127 Spring element
128 Opening
129 Opening
130 Opening
131 Opening
132 Finger guard element
133 Leg
134 Leg
135 Joining portion
136 Insertion bevel
137 Insertion bevel
138 First part
139 Second part
140 First bearing point
141 First bearing point
142 Second bearing point
143 Second bearing point
144 Pin
145 Pin
146 Pin
147 Pin
148 Wall
200 Connection element
300 Connection arrangement
310 Holding frame
311 Opening
312 Attaching element
400 Wall
410 Wall opening
E Insertion direction

The invention claimed is:

1. A connection unit for connecting at least one connection element, comprising:
a housing;
a first contact element;
a second contact element arranged on an opposite side to the first contact element, at least one receiving space being formed between the first contact element and the second contact element for clamping the at least one connection element between the first contact element and the second contact element; and
at least one finger guard element which covers at least some regions of the first contact element and the second contact element in a region of the at least one receiving space,
wherein the first contact element, the second contact element, and the finger guard element are borne in the housing in a floating manner, and
wherein the first contact element and the second contact element are joined together by two spring elements which are arranged at a distance from one another on the two contact elements, a first spring element being attached to a first end region of the two contact elements and a second spring element being fastened to a second end region of the two contact elements, the two spring elements each comprising a U-shape bent wire spring.

2. The connection unit of claim 1, wherein the at least one finger guard element is movably borne on the first contact element and on the second contact element.

3. The connection unit of claim 1, wherein the at least one finger guard element has a U shape having a first leg and a second leg formed in parallel with the first leg, the first leg covering the first contact element at least in some regions, and the second leg covering the second contact element at least in some regions.

4. The connection unit of claim 1, wherein the at least one finger guard element comprises two parts.

5. The connection unit of claim 1, wherein the first contact element and the second contact element each have a first bearing point and a second bearing point spaced apart from the first bearing point, the first contact element and the second contact element being held on the at least one finger guard element by the first bearing point, and the first contact element and the second contact element being held on the housing by the second bearing point.

6. The connection unit of claim 5, wherein the first bearing point and the second bearing point of the two contact elements each comprise at least one slot.

7. The connection unit of claim 1, wherein the at least one finger guard element is borne in the housing in a floating manner by a slotted guide.

8. The connection unit of claim 1, wherein the first contact element and the second contact element each comprise an oblong metal sheet extending in one plane.

9. The connection unit of claim 1, wherein the first contact element and the second contact element each have a contact region in the region of the at least one receiving space, which contact regions have a rounded form at least in some portions.

10. A connection arrangement, comprising:
a plurality of the connection unit of claim 1, arranged in a row.

11. The connection arrangement of claim 10, further comprising:
a holding frame, the plurality of connection units arranged in the row being held in the holding frame.

12. An electronic device, comprising:
at least one connection unit of claim 1.

13. An electronic device, comprising:
at least one connection arrangement of claim 10.

14. A connection unit for connecting at least one connection element, comprising:
- a housing;
- a first contact element;
- a second contact element arranged on an opposite side to the first contact element, at least one receiving space being formed between the first contact element and the second contact element for clamping the at least one connection element between the first contact element and the second contact element; and
- at least one finger guard element which covers at least some regions of the first contact element and the second contact element in a region of the at least one receiving space,
- wherein the first contact element, the second contact element, and the finger guard element are borne in the housing in a floating manner, and
- wherein the first contact element and the second contact element each have a first bearing point and a second bearing point spaced apart from the first bearing point, the first contact element and the second contact element being held on the at least one finger guard element by the first bearing point, and the first contact element and the second contact element being held on the housing by the second bearing point.

15. The connection unit of claim 14, wherein the first bearing point and the second bearing point of the two contact elements each comprise at least one slot.

* * * * *